(12) United States Patent
Li et al.

(10) Patent No.: US 8,484,623 B2
(45) Date of Patent: Jul. 9, 2013

(54) EFFICIENT PROGRAM INSTRUMENTATION

(75) Inventors: Juan Jenny Li, Basking Ridge, NJ (US); David Mandel Weiss, Long Valley, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 1188 days.

(21) Appl. No.: 12/240,876

(22) Filed: Sep. 29, 2008

(65) Prior Publication Data

US 2009/0249309 A1 Oct. 1, 2009

Related U.S. Application Data

(63) Continuation-in-part of application No. 12/056,026, filed on Mar. 26, 2008.

(51) Int. Cl.
*G06F 9/44* (2006.01)
*G06F 9/45* (2006.01)

(52) U.S. Cl.
USPC ............ 717/132; 717/130; 717/156; 717/158; 717/160

(58) Field of Classification Search
None
See application file for complete search history.

(56) References Cited

U.S. PATENT DOCUMENTS

| | | | |
|---|---|---|---|
| 5,790,858 A * | 8/1998 | Vogel ............................ | 717/130 |
| 5,987,250 A | 11/1999 | Subrahmanyam | |
| 6,105,018 A * | 8/2000 | Demers et al. ........................ | 1/1 |
| 6,481,008 B1 | 11/2002 | Chaiken et al. | |
| 6,671,876 B1 | 12/2003 | Podowski | |
| 6,938,249 B2 * | 8/2005 | Roediger et al. ............... | 717/160 |
| 7,251,810 B1 | 7/2007 | Noite | |
| 7,386,838 B2 * | 6/2008 | Schmidt ........................ | 717/130 |
| 7,475,386 B1 | 1/2009 | Shapiro et al. | |
| 7,673,295 B1 * | 3/2010 | Lin ................. | 717/156 |
| 7,757,218 B2 | 7/2010 | Aroya | |
| 7,890,941 B1 * | 2/2011 | Garud et al. ................... | 717/158 |
| 7,962,905 B2 | 6/2011 | Inamdar | |
| 8,271,960 B2 * | 9/2012 | Schmidt ........................ | 717/132 |
| 8,291,399 B2 * | 10/2012 | Li et al. ......................... | 717/158 |
| 8,356,289 B2 * | 1/2013 | Li et al. ......................... | 717/132 |
| 2002/0095660 A1 | 7/2002 | O'Brien et al. | |
| 2003/0041041 A1 | 2/2003 | Cristianini | |
| 2003/0046029 A1 | 3/2003 | Wiener et al. | |
| 2004/0088666 A1 | 5/2004 | Poznanovic et al. | |
| 2004/0088699 A1 | 5/2004 | Suresh | |
| 2005/0050527 A1 | 3/2005 | McCrady et al. | |
| 2005/0060697 A1 | 3/2005 | Bicsak et al. | |
| 2005/0134587 A1 | 6/2005 | Geiger et al. | |
| 2005/0223361 A1 * | 10/2005 | Belbute ........................ | 717/124 |

(Continued)

OTHER PUBLICATIONS

Definition of "Basic block", Wikipedia website, 3 pages, <http://en.wikipedia.org/wiki/Basic_block>.*
Ozturk et al., BB-GC: Basic-Block Level Garbage Collection, Mar. 2005, 6 pages, <http://delivery.acm.org/10.1145/1050000/1049268/228821032.pdf>.*

(Continued)

*Primary Examiner* — Thuy Dao

(57) ABSTRACT

A method for determining the number and location of instrumentation probes to be inserted into a program is disclosed. The method advantageously inserts the minimum number of probes that are required to obtain execution coverage for every node in the program's control-flow graph. In addition, the method requires only type of node marking and one bit to store each probe, and does not require the assignment of weights to arcs or nodes of the control-flow graph. In the illustrative embodiment, the nodes of a control-flow graph are partitioned into non-empty sets, where each non-empty set corresponds to a super nested block of the program.

20 Claims, 15 Drawing Sheets

U.S. PATENT DOCUMENTS

| | | |
|---|---|---|
| 2005/0229165 A1 | 10/2005 | Ma et al. |
| 2006/0112377 A1* | 5/2006 | Nacul et al. .................. 717/140 |
| 2006/0212874 A1 | 9/2006 | Johnson et al. |
| 2006/0218537 A1 | 9/2006 | Aroya |
| 2007/0074175 A1 | 3/2007 | Bengtsson et al. |
| 2007/0089097 A1* | 4/2007 | Hu et al. ...................... 717/132 |
| 2007/0103175 A1 | 5/2007 | Eigler |
| 2007/0174750 A1 | 7/2007 | Borin |
| 2008/0052696 A1 | 2/2008 | Pradadarao |
| 2008/0089760 A1 | 4/2008 | Yao |
| 2009/0007077 A1 | 1/2009 | Musuvathi et al. |
| 2009/0055798 A1* | 2/2009 | Chan et al. ................... 717/110 |
| 2009/0089771 A1 | 4/2009 | Gill et al. |
| 2009/0094589 A1 | 4/2009 | Gupta et al. |
| 2009/0106184 A1* | 4/2009 | Lang et al. ....................... 706/59 |
| 2009/0249308 A1 | 10/2009 | Li et al. |
| 2011/0131560 A1 | 6/2011 | Pradadarao |

OTHER PUBLICATIONS

Thakur et al., Comprehensive path-sensitive data-flow analysis, Apr. 2008, 9 pages, <http://delivery.acm.org/10.1145/1360000/1356066/p55-thakur.pdf>.*

Adam Betts and Guillem Bernat, "Tree-Based WCET Analysis on Instrumentation Point Graphs", Real-Times Systems Research Group, University of York, Apr. 24, 2006.

Mustafa M. Tikir and Jeffrey K. Hollingworth, "Efficient Online Computation of Statement Coverage", Computer Science Department, University of Maryland, College Park, MD, Nov. 2005.

J. Jenny Li, David M. Weiss, and Howell Yee, "An Automatically-Generated Run-Time Instrumenter to Reduce Coverage Testing Overhead", Proceedings of the 3$^{rd}$ International Workshop on Automation of Software Test (AST'08), pp. 49-56, 2008.

* cited by examiner

Figure 1 (PRIOR ART)

PROGRAM 100
(TWO-COLUMN CODE LISTING)

```
Non-branching statementA1;          else {
Non-branching statementA2;              Non-branching statementF1;
......                              Non-branching statementF2;
Non-branching statementAn;          ......
While Expression1 {                 Non-branching statementFr;
If Expression2 {                    }
    Switch Expression3 {            }
        Case Expression4:           Non-branching statementG1;
            Non-branching statementB1;  Non-branching statementG2;
Non-branching statementB2;          ......
......                              Non-branching statementGs;
Non-branching statementBm;
        Case Expression5:
            Non-branching statementC1;
Non-branching statementC2;
......
Non-branching statementCo;
    }
    If Expression6 {
        Non-branching statementD1;
    }
Non-branching statementD2;
......
Non-branching statementDp;
    } else {
        Non-branching statementE1;
Non-branching statementE2;
......
Non-branching statementEq;
}
```

EFFICIENT PROGRAM INSTRUMENTATION

CROSS-REFERENCE TO RELATED APPLICATIONS

This application is a continuation-in-part of U.S. patent application Ser. No. 12/056,026, filed 26 Mar. 2008 (now pending), entitled "Super Nested Block Method to Minimize Coverage Testing Overhead", which is incorporated by reference.

FIELD OF THE INVENTION

The present invention relates to run-time analysis of software in general, and, more particularly, to a method of program instrumentation.

BACKGROUND OF THE INVENTION

Instrumentation is a technique that can enable engineers to comprehend, monitor, and assess the operation of software. Typically, a program is instrumented by inserting probes at various points in the program, where the probes report a variety of information such as whether certain portions of a program have been reached (referred to as coverage), the number of times that various portions of the program have been executed (referred to as execution counts), how much time is spent in various portions of the program, and so forth. Instrumentation thus facilitates the identification of coverage efficiency, bottlenecks, bugs, and other deficiencies in a program and, consequently, can aid in the process of improving the quality, security, efficiency, and performance of programs.

The introduction of probes into a program, however, adds overhead that can slow down the execution of the program, and thus there is a tradeoff when inserting probes into a program. Ideally, the probes should cover all of the various execution paths of the program, and should be sufficient in number so that the reported information is fine-grained enough to be useful. However, if there are too many probes, then program runtime performance might suffer appreciably, which is unacceptable in applications such as real-time embedded systems and Voice over Internet Protocol (VoIP).

Typically methods for determining probe insertion points in a program are based on a control-flow graph that is derived from the program. FIG. 1 depicts illustrative program 100, and FIG. 2 depicts control-flow graph 200 corresponding to program 100, both in accordance with the prior art. As shown in FIG. 2, control-flow graph 200 comprises nodes 201-1 through node 201-13, connected by arcs as shown. For convenience, each node of control-flow graph 200 has been assigned a label that indicates the portion of program 100 (known as a basic block) to which it corresponds.

In one method of the prior art, known as a maximum spanning tree method, arcs are first added to the control-flow graph, as necessary, so that at each node, the incoming execution count equals the outgoing execution count. Weights are then assigned to the arcs of the (possibly-augmented) control-flow graph, and a maximum spanning tree is generated (i.e., a spanning tree such that the sum of its arc weights is maximum.) Finally, a probe is inserted at every node in the control-flow graph that leads to an arc not in the spanning tree.

FIG. 3 depicts an illustrative maximum spanning tree for control-flow graph 200, indicated by boldface arcs, in accordance with the prior art. (For simplicity, weights are not depicted in the figure.) As shown in FIG. 3, an arc from node 201-13 to node 201-1 has been added to ensure that the incoming and outgoing execution counts are equal at each node.

It is readily apparent from FIG. 3 that the following arcs are not part of the spanning tree:
(201-6, 201-8) [B-E6],
(201-9, 201-11) [D-E6E]
(201-4, 201-12) [F-E1E]
(201-12, 201-2) [E1E-E1]
(201-2, 201-13) [E1-G]
Consequently, probes are inserted in nodes B, D, F, E1E, and E1.

A key disadvantage of the maximum spanning tree method is that it requires execution counts on each probe, which can consume a great deal of memory. Moreover, the counter values can grow so large that they impact the original application, and there is no way to reset the counters. Consequently, the maximum spanning tree method is typically not practical for program monitoring during field operation.

In another method of the prior art, known as a super block dominator method, a pre-dominator tree of the control-flow graph is first generated—i.e., a tree in which a first node is an ancestor of a second node if and only if the first node is guaranteed to execute before the second node. FIG. 4 depicts pre-dominator tree 400 for control-flow graph 200, in accordance with the prior art.

Next, a post-dominator tree of the control-flow graph is generated—i.e., a tree in which a first node is a descendent of a second node if and only if the first node is guaranteed to execute before the second node. FIG. 5 depicts post-dominator tree 500 for control-flow graph 200, in accordance with the prior art.

The pre-dominator and post-dominator trees are then combined into a single dominator graph. FIG. 6 depicts dominator graph 600 for control-flow graph 200, in accordance with the prior art. Dominator graph 600 is simply the union of pre-dominator tree 400 and post-dominator tree 500, and can be obtained by adding the arcs of post-dominator tree 500 to pre-dominator tree 400.

Next, the strongly-connected components of the dominator graph are determined. A strongly-connected component is a maximal set of nodes in a directed graph such that every node in the set is reachable from every other node in the set. FIG. 7 depicts the strongly-connected components of dominator graph 600, in accordance with the prior art.

Finally, each strongly-connected component is defined as a respective super block, and a probe is inserted in each of the super blocks. In this example, a probe is inserted into each of the following super blocks of program 100: {A, E1, G}, {E2, E1E}, {F}, {E3, E6, E6E}, {B}, {C}, {D}, and {E}.

SUMMARY OF THE INVENTION

The present invention provides a novel method for determining the number and location of instrumentation probes to be inserted into a program. In particular, the illustrative embodiment advantageously inserts the minimum number of probes that are required to obtain execution coverage for every node in the program's control-flow graph. Moreover, the method requires only one type of node marking and one byte to store information for each probe. The illustrative embodiment thus minimizes instrumentation overhead that can slow down program execution, and is therefore especially well-suited to monitoring Voice over Internet Protocol (VoIP) software.

In accordance with the illustrative embodiment, the nodes of a control-flow graph are partitioned into non-empty sets, where each non-empty set corresponds to a super nested block of the program. A super nested block is a block of code such that for any two consecutive lines of code X and Y, if X executes, then Y also executes at some point after the execution of X, albeit possibly with one or more other lines of code executed in between X and Y. Thus, a super nested block might have a branching statement and correspond to a plurality of nodes of the control-flow graph, or instead might be a basic block and consist of a single node of the control-flow graph.

The illustrative embodiment employs a recursive method that identifies the set of super nested blocks while traversing a control-flow graph. The method can be performed on a control-flow graph that has already been derived from a program, or it can advantageously be performed while the control-flow graph is itself being constructed during parsing of the program. Once the super nested blocks of a program have been determined, a probe is inserted into each innermost layer of basic blocks. The outer-layer blocks' coverage information can be inferred from those probes. The resulting instrumentation enables execution coverage information to be obtained for every node and arc in the control-flow graph, with a minimum number of probes.

The illustrative embodiment comprises: partitioning a program into one or more blocks of code, wherein any two consecutive lines of code X and Y of said program are placed in the same block if and only if the execution of X implies the execution of both X and Y, albeit not necessarily consecutively; and inserting a probe into each of said blocks of code; wherein the partitioning of said program is based on a partition of the nodes of a control-flow graph G for said program; and wherein the nodes of said control-flow graph G are partitioned by an algorithm that employs a single type of mark to mark nodes.

BRIEF DESCRIPTION OF THE DRAWINGS

FIG. 1 depicts an outline of illustrative program 100, in accordance with the prior art.

DETAILED DESCRIPTION

Figure 2:
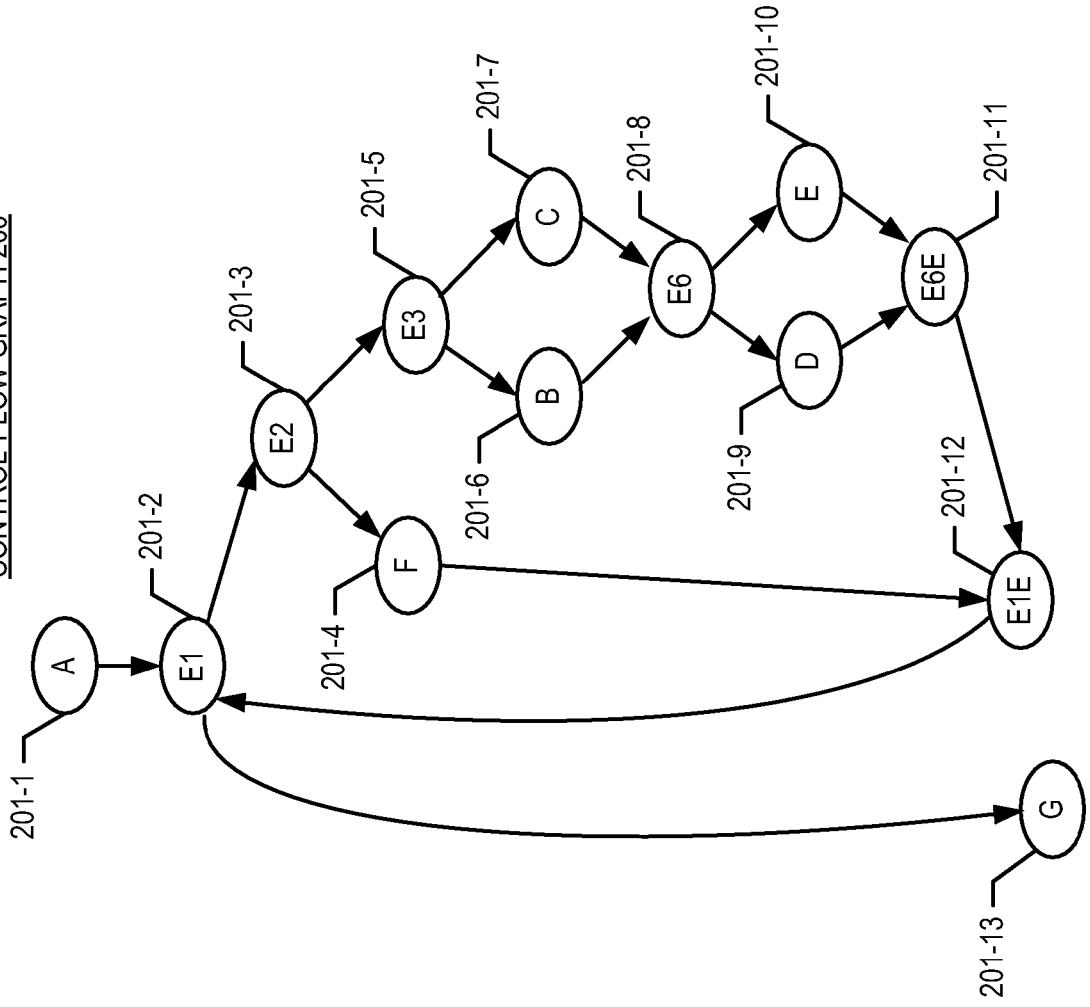
FIG. 2 depicts a control-flow graph corresponding to illustrative program 100, in accordance with the prior art.
Figure 3:
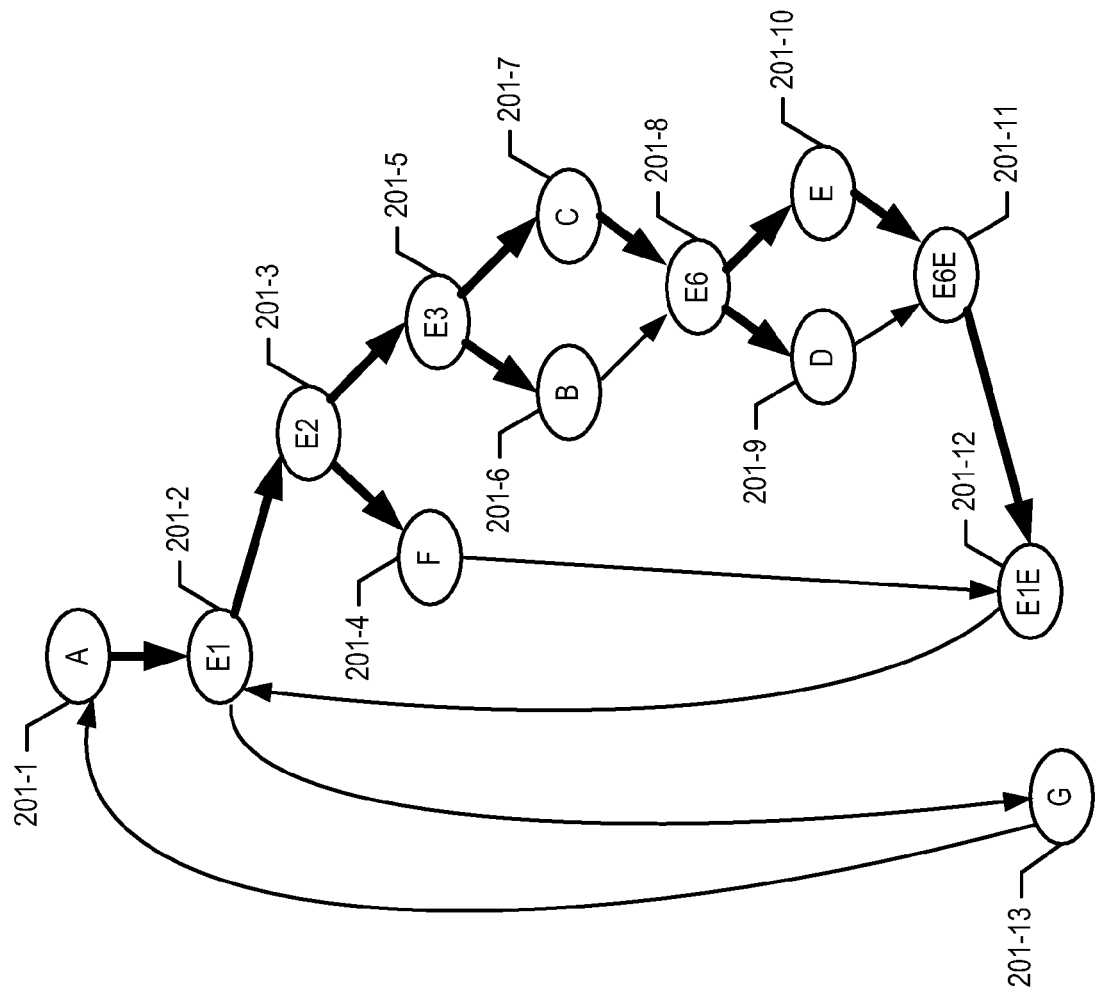
FIG. 3 depicts an illustrative maximum spanning tree of control-flow graph 200, as shown in FIG. 2, for a first instrumentation method of the prior art.
Figure 4:
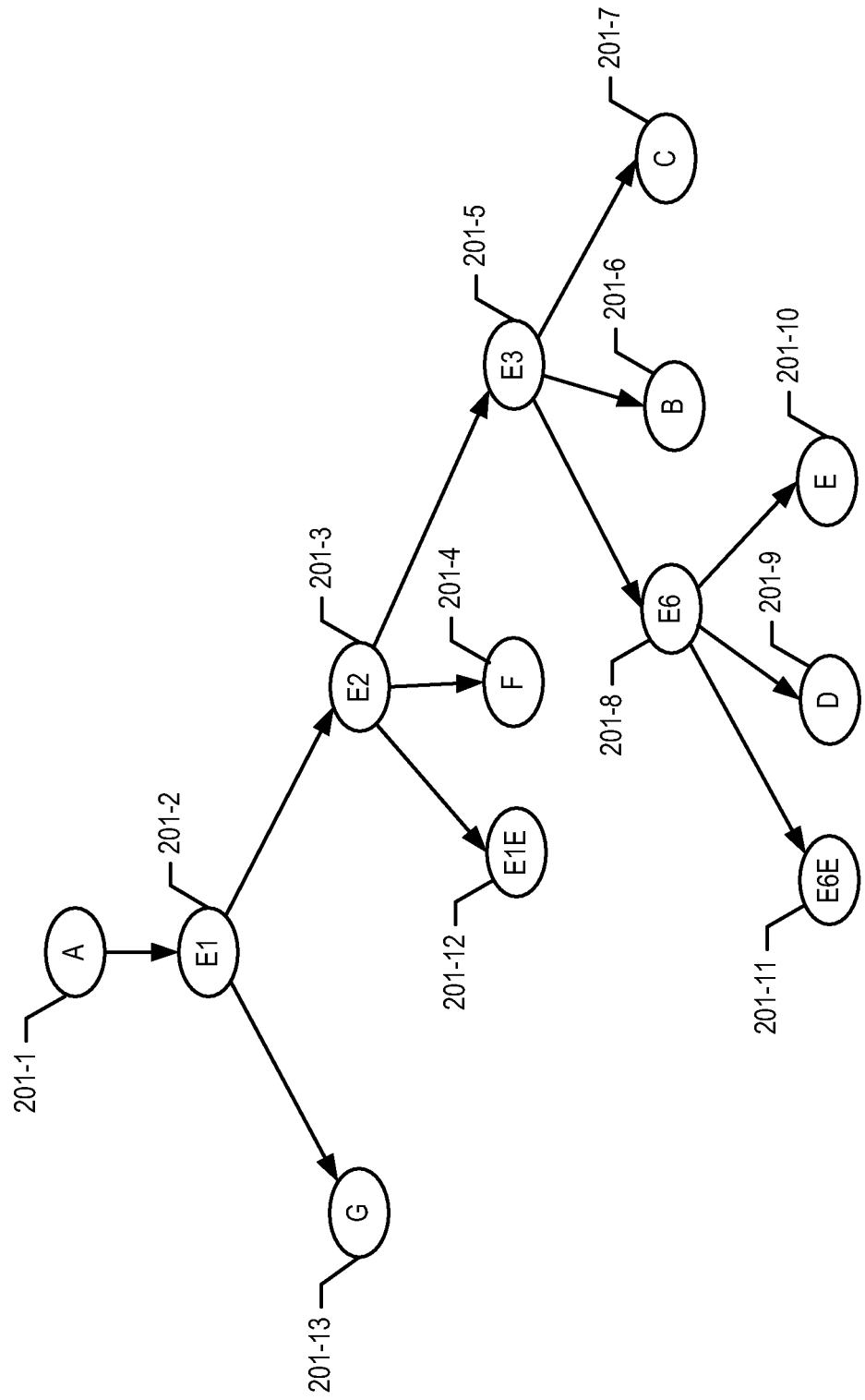
FIG. 4 depicts a pre-dominator tree for control-flow graph 200 for a second instrumentation method of the prior art.
Figure 5:
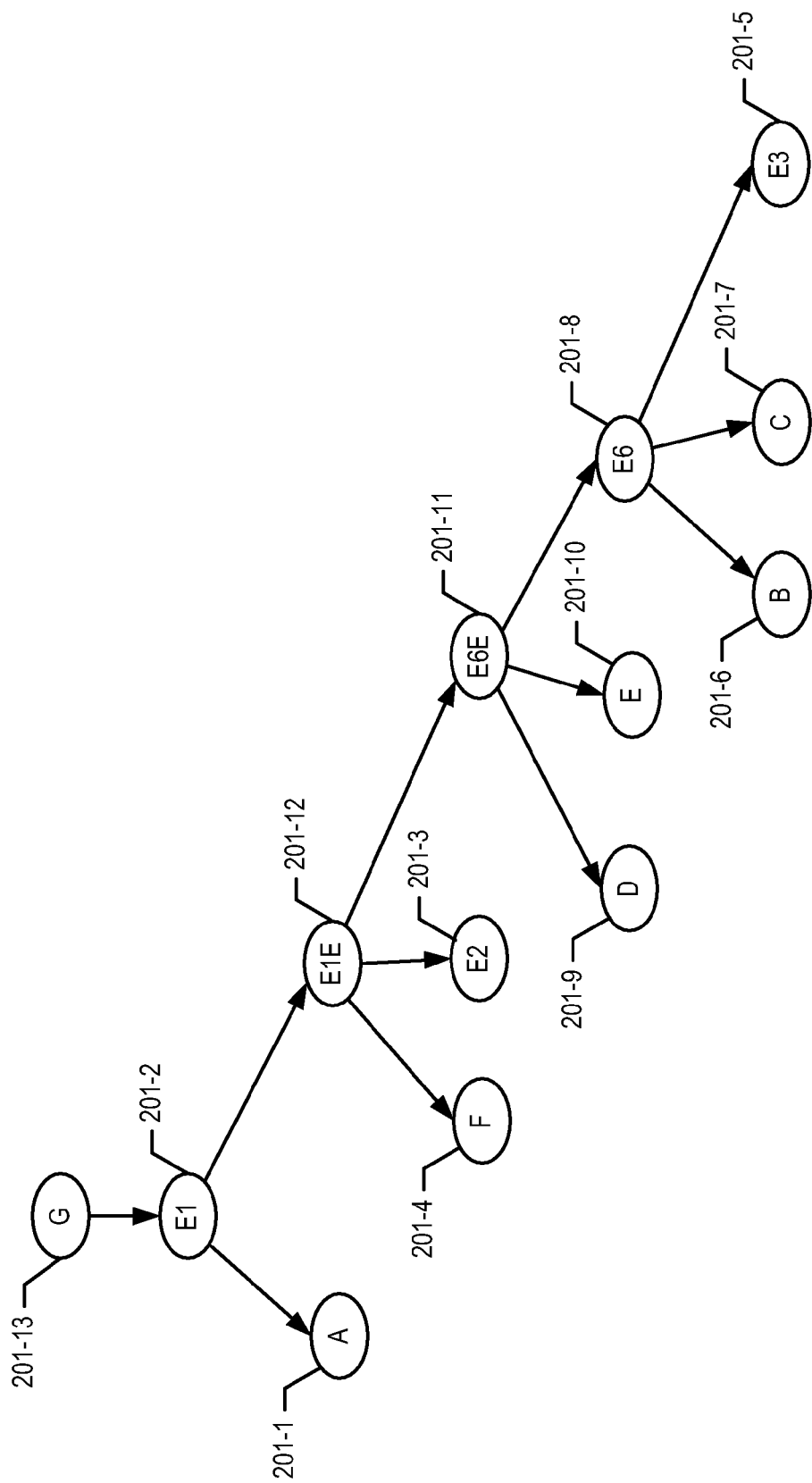
FIG. 5 depicts a post-dominator tree for control-flow graph 200 for a second instrumentation method of the prior art.
Figure 6:
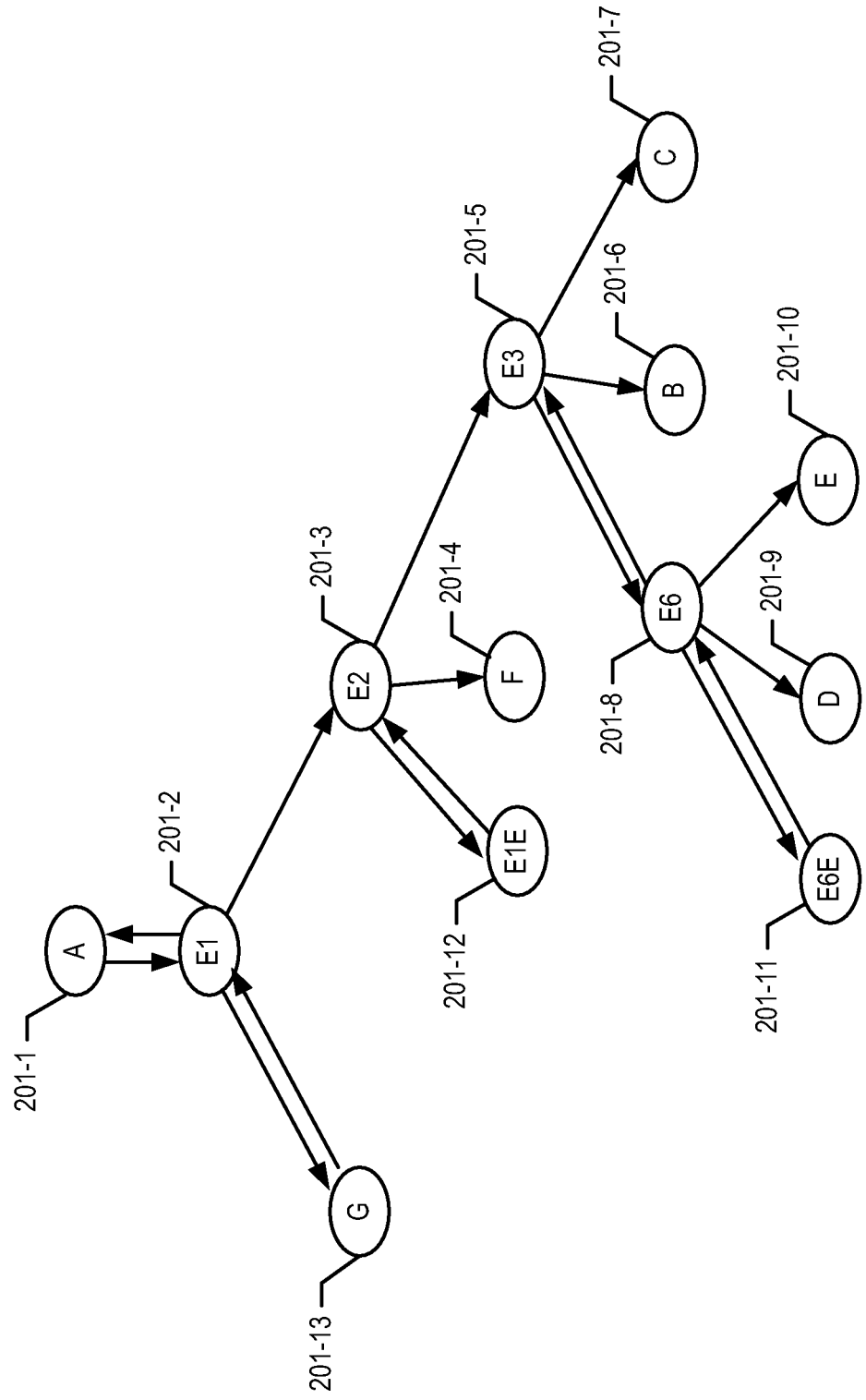
FIG. 6 depicts a dominator graph for control-flow graph 200 for a second instrumentation method of the prior art.
Figure 7:
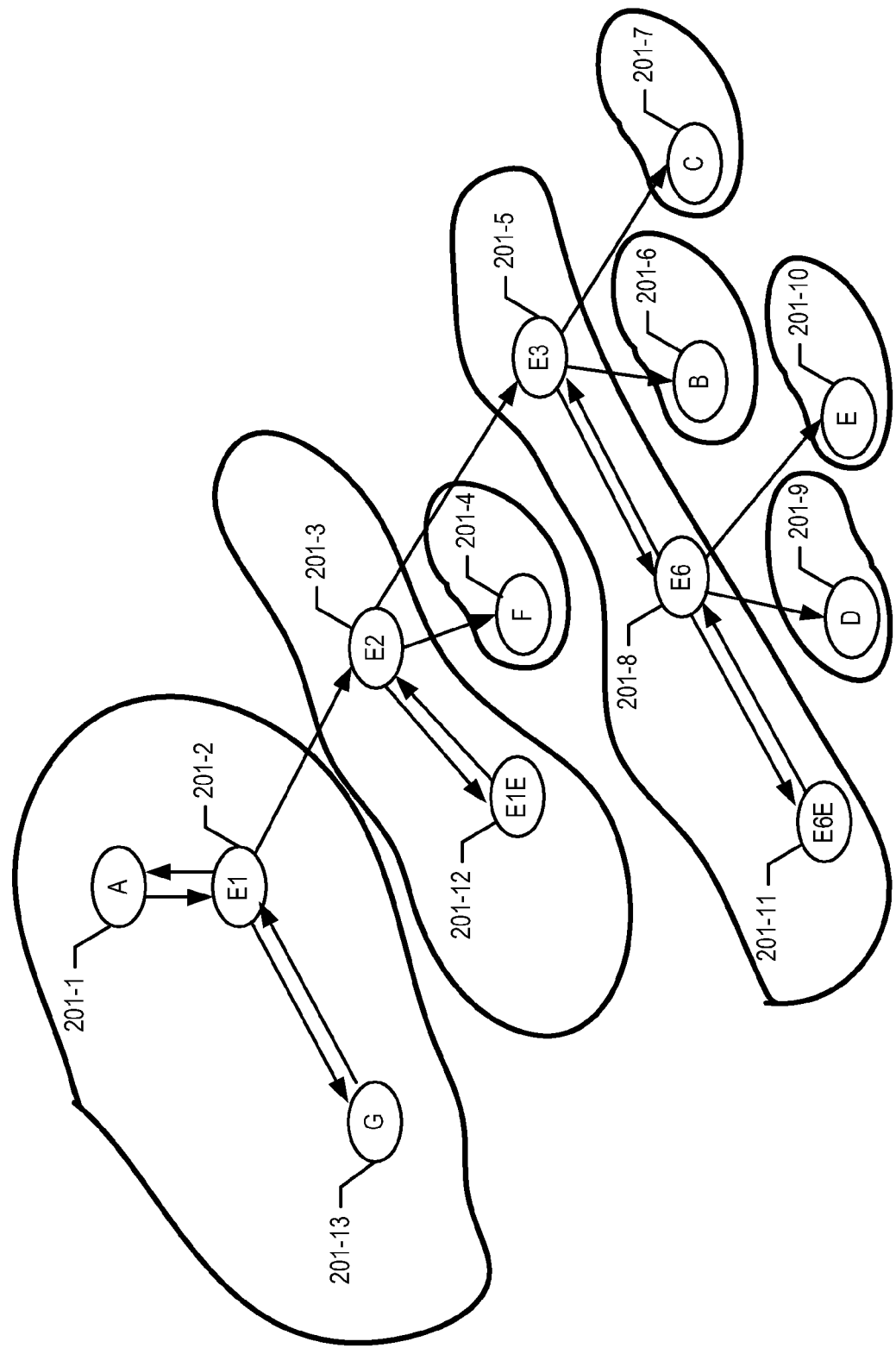
FIG. 7 depicts the strongly-connected components of dominator graph 600, as shown in FIG. 6, for a second instrumentation method of the prior art.
Figure 8:
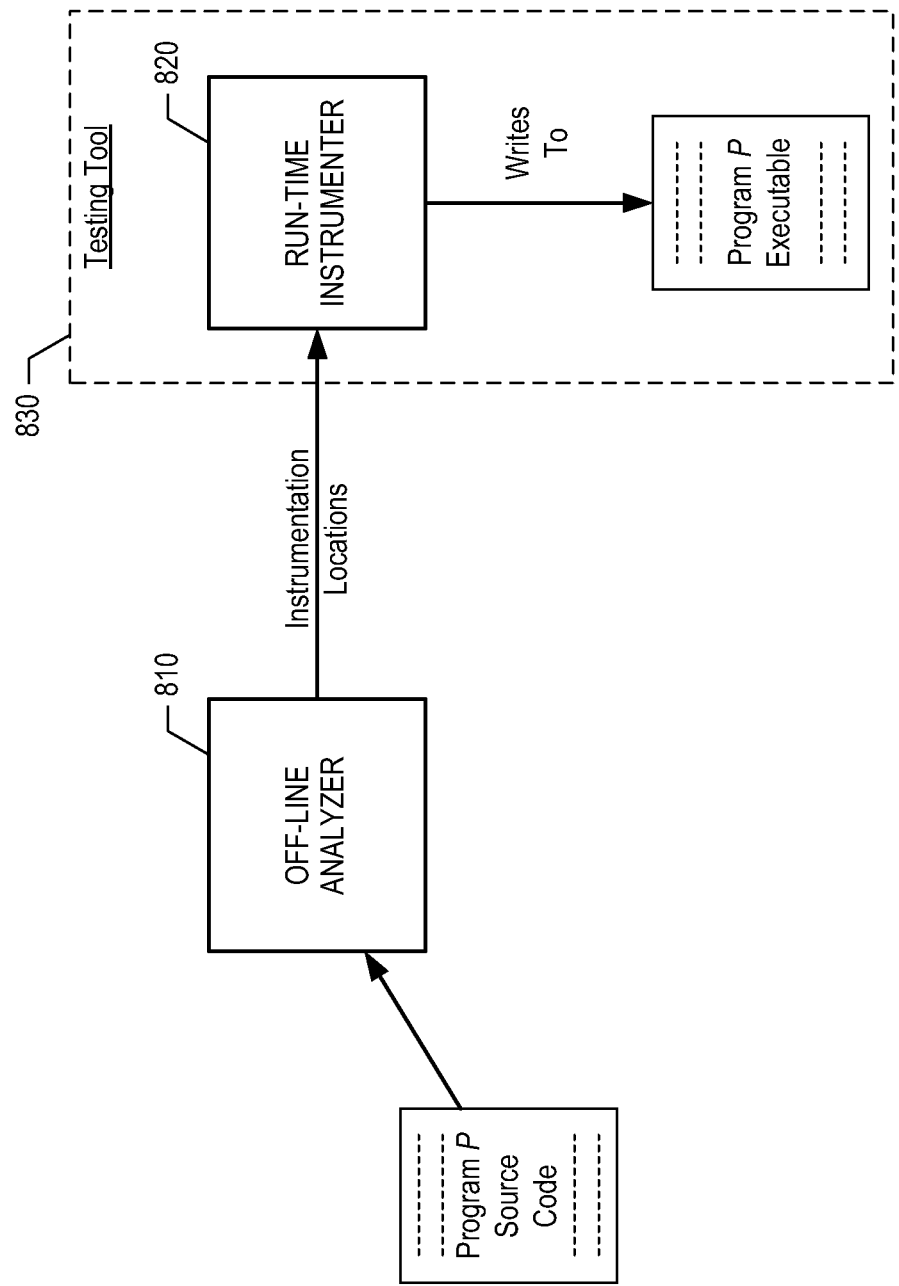
FIG. 8 depicts the high-level architecture of a first illustrative embodiment of the present invention.

FIG. 8 depicts the high-level architecture of a first illustrative embodiment of the present invention. As shown in FIG. 8, the first illustrative embodiment comprises off-line analyzer 810, run-time instrumenter 820, and testing/monitoring tool 830, interconnected as shown.

Off-line analyzer 810 comprises software, or hardware, or a combination of software and hardware capable of determining one or more locations in a program at which an instrumentation probe is to be inserted. The determination of instrumentation locations by off-line analyzer 810—referred to as the Simplified Super Nested Block Method—is described in detail below. The method is first described informally as applied to illustrative control-flow graph 200, and subsequently a formal specification of the method is provided.

Informal Description of the Simplified Super Nested Block Method

An informal description of the Simplified Super Nested Block Method as applied to illustrative control-flow graph 200 is first provided in this section. A formal specification of the method is subsequently provided in the following section.

In the first task of the method, the first layer of super nested block starting with the root node (i.e., node 201-1 or "A" for control-flow graph 200) is identified. In the case of control-flow graph 200, the first layer of super nested block consists of node 201-1 (A), node 201-2 (E1), node 201-12 (E1E), and node 201-13 (G), which corresponds to the following lines of code:

```
Non-branching statementA1;
Non-branching statementA2;
......
Non-branching statementAn;
While Expression1 {
}
Non-branching statementG1;
Non-branching statementG2;
......
Non-branching statementGs;
}
```

As will be appreciated by those skilled in the art, after reading this specification, the lines of code above constitute a super nested block, because for any two consecutive lines of code X and Y in the block, if X is executed, then Y is also executed at some point after the execution of X, albeit possibly with one or more other lines of code executed in between X and Y. This first super nested block is subsequently referred to as SNB1.

The second task of the method checks whether the current super nested block (at this point, SNB1) has any branching statements. If not (i.e., the super nested block comprises a single node of the control-flow graph, and is thus simply a basic block), the single node is marked "probe-needed". Otherwise, expand the branching points into the roots of a second-layer (or "child") super nested block.

In the case of control-flow graph 200, the branching point E1 is expanded into the node 201-3 (E2) and the node 201-13 (G). Node 201-13 is a basic block itself and does not need further expansion and thus is marked as "probe-needed". Node 201-3 is a branching point and needs further expansion.

In the case of control-flow graph 200, the second layer of super nested block is the first-layer statements inside the while loop, starting from node 201-3. This second super nested block, SNB2, consists of a single node, node 201-3 (E2), which corresponds to the following lines of code:

```
If Expression2 {
......
}
else {
......
}
```

The second task is then repeated for super nested block SNB2. Because SNB2 includes a branching statement, it is further expanded into a third layer with two super nested blocks. The first third-layer super nested block, SNB31, consists of node 201-5 (E3), node 201-8 (E6), and node 201-11 (E6E) and corresponds to the following lines of code:

```
Switch Expression3 {
...
}
If Expression6 {
...
} else {
...
}
```

Because super nested block SNB31 has more than one branching statement, all of them must be further expanded. The node 201-8 (E6) is expanded into node 201-9 (D) and node 201-10 (E) and the node 201-5 (E3) is expanded into nodes 201-6 (B) and 201-7 (C).

All four nodes, 201-9 (D), 201-10 (E), 201-6 (B), and 201-7 (C) must be marked with "probe-needed" because they cannot be further expanded. Note that even though the coverage of nodes 201-8 (E6) and 201-11 (E6E) can be determined by nodes 201-6 (B) and 201-7 (C), the coverage of nodes 201-9 (D) and 201-10 (E) cannot be determined by nodes 201-6 (B) and 201-7 (C), and thus both nodes 201-9 (D) and 201-10 (E) need to be selected in addition to nodes 201-6 (B) and 201-7 (C). This is a point where coverage is different from execution counters, where node 201-9 (D) can be determined by B+C−E or E can be determined by B+C−D.

The second third-layer super nested block, SNB32, consists of node 201-4 (F), and corresponds to the following lines of code:

```
Non-branching statementF1;
Non-branching statementF2;
......
Non-branching statementFr;
```

Because super nested block SNB32 does not have any branching statements (i.e., it is a basic block), node 201-4 (F) is marked "probe-needed". The second task is now completed.

In the third and final task, a probe is inserted into the portions of source program 100 that correspond to the nodes marked "probe-needed": node 201-6 (B), node C, node 201-9 (D), node 201-10 (E), and node 201-4 (F).

As will be appreciated by those skilled in the art, the expansion of subsequent layers of the control-flow graph lends itself very well to a recursive implementation, and this is in fact how the method is formally specified in the subsequent section. As will further be appreciated by those skilled in the art, in some other embodiments of the present invention the expansion might be performed in an alternative, non-recursive, fashion (e.g., iteratively via a breadth-first search traversal of the control-flow graph, etc.), and it will be clear to those skilled in the art, after reading this disclosure, how to make and use such alternative embodiments.

Formal Specification of the Simplified Super Nested Block Method

Figure 9:
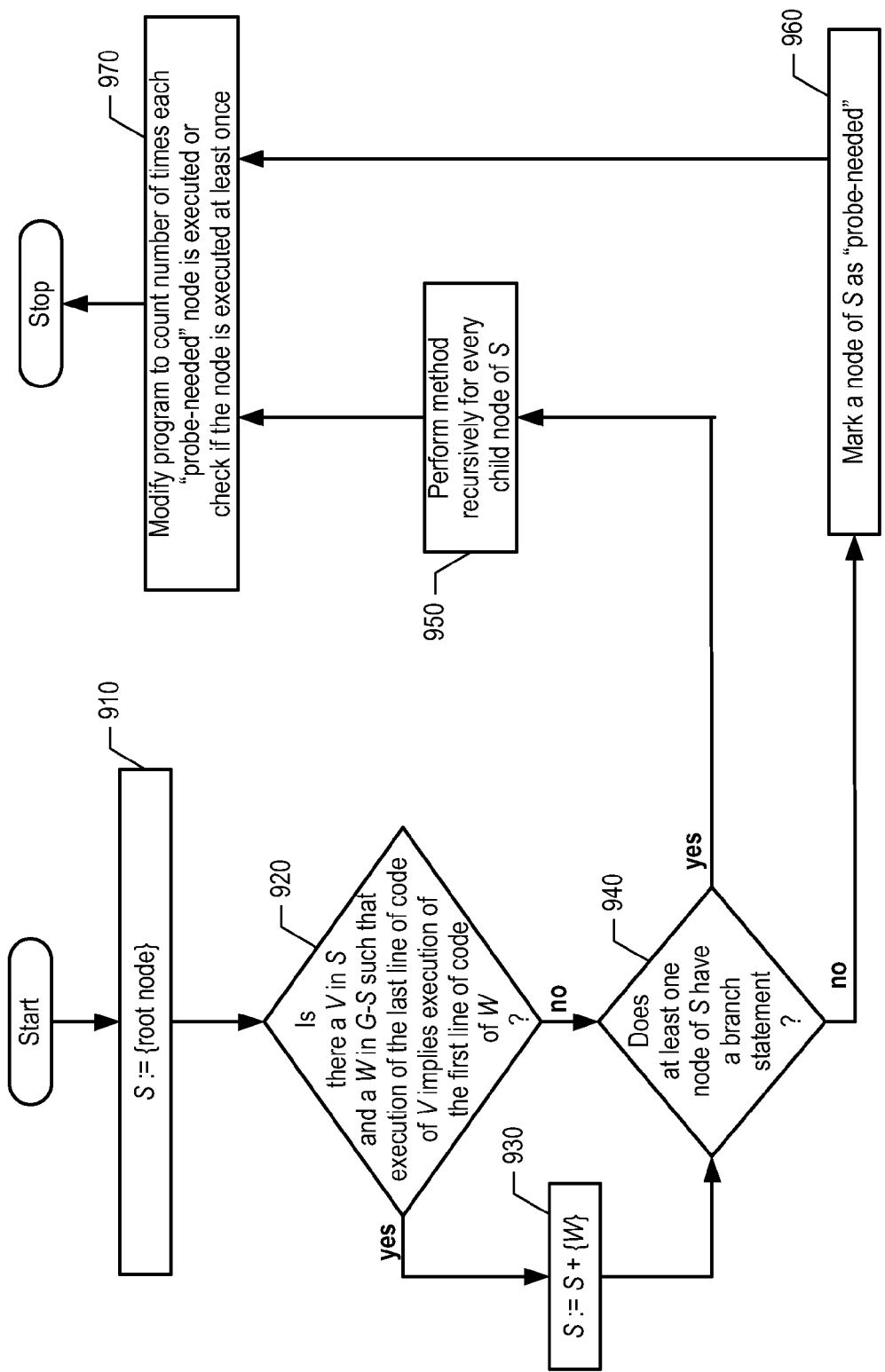
FIG. 9 depicts a flowchart of the Super Nested Block Method, in accordance with the illustrative embodiments of the present invention.

FIG. 9 depicts a flowchart of the salient tasks of the Simplified Super Nested Block Method, in accordance with the illustrative embodiments of the present invention. In the illustrative embodiments of the present invention, the method of FIG. 9 is performed by off-line analyzer 810.

At task 910, variable S is initialized to a singleton set containing the root node.

Task 920 checks whether there is a node V in S and a node W in G-S such that execution of the last line of code of V implies execution of the first line of code of W. If so, execution proceeds to task 930, otherwise execution continues at task 940.

At task 930, node W is added to set S.

Task 940 checks whether at least one node of set S has a branch statement. If so, execution proceeds to task 950, otherwise execution continues at task 960.

At task 950, the method is performed recursively for every child node of set S. After task 950, execution continues at task 970.

At task 960, one node of set S is marked as "probe-needed".

At task 970, the program corresponding to control-flow graph G is modified to count the number of times that each node marked "probe-needed" is executed, or simply check if the node is executed at least once. After task 970, the method of FIG. 9 terminates.

Run-time instrumenter 820 comprises software, or hardware, or a combination of software and hardware capable of instrumenting program P during program P's execution, in well-known fashion. In accordance with the first illustrative embodiment of the present invention, run-time instrumenter 820 replaces each instrumentation location in the executing program (e.g., executable program P, etc.) with code patches for saving registers, running probes, restoring registers, removing probes after the first time that they are executed, and putting back the original code at the instrumentation location. In addition, run-time instrumenter 820 uses the probes to generate and report code coverage information concerning the execution of program P. In some embodiments of the present invention, run-time instrumenter 820 might report code coverage information after the execution of program P has completed, while in some other embodiments, run-time instrumenter 820 might report code coverage information during the execution of program P, while in still some other embodiments run-time instrumenter 820 might report code coverage information both during and after the execution of program P.

The automatic generated run-time instrumenter includes two parts: the static creation and dynamic parameter setting. The static part includes the following program portions: 1) create a patch object as the one single instance of the top-level class; 2) create a new process of the program under testing or have a running one attached; 3) create a probe; 4) set instrumentation points; 5) insert the probe to the instrumentation points; 6) repeat parts 3), 4), and 5) until all instrumentation points are properly handled. The dynamic part is the memory size and value of instrumentation location.

Testing/monitoring tool 830 comprises software, or hardware, or a combination of software and hardware capable of running a run-time instrumenter (e.g., run-time instrumenter 820, etc.) and an executable under test (e.g., executable program P, etc.) in parallel, in well-known fashion. During the testing of the target program, whenever the instrumentation point is reached, the execution is redirected to the code patches of saving registers, running probes, restoring registers, and restoring the original code back to the instrumentation point.

Figure 10:
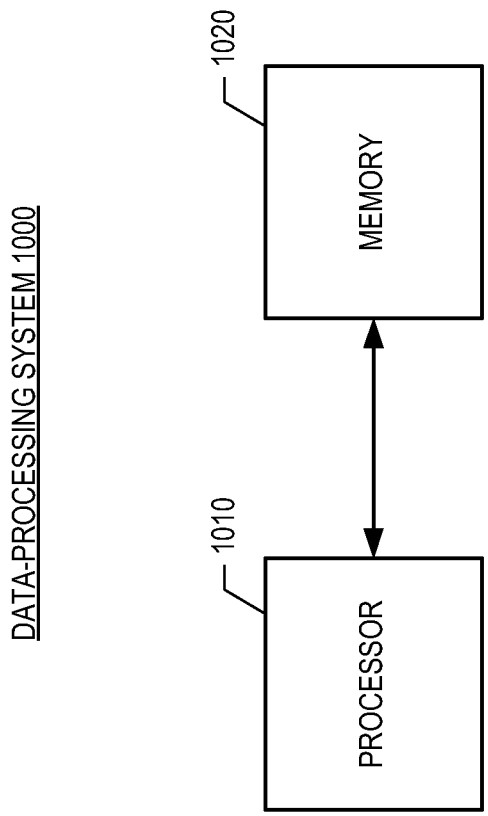
FIG. 10 depicts a data-processing system for instrumenting programs in accordance with the first illustrative embodiment of the present invention.

FIG. 10 depicts data-processing system 1000 for instrumenting programs in accordance with the first illustrative embodiment of the present invention. As shown in FIG. 10, data-processing system 1000 comprises processor 1010 and memory 1020, interconnected as shown.

Processor 1010 is a general-purpose processor that is capable of executing instructions stored in memory 1020, of reading data from and writing data into memory 1020, and of executing the tasks associated with off-line analyzer 810 and run-time instrumenter 820, as described above. As will be appreciated by those skilled in the art, in some alternative embodiments of the present invention, processor 1010 might instead be a special-purpose processor; in any case, it will be clear to those skilled in the art, after reading this disclosure, how to make and use processor 1010.

Figure 11:
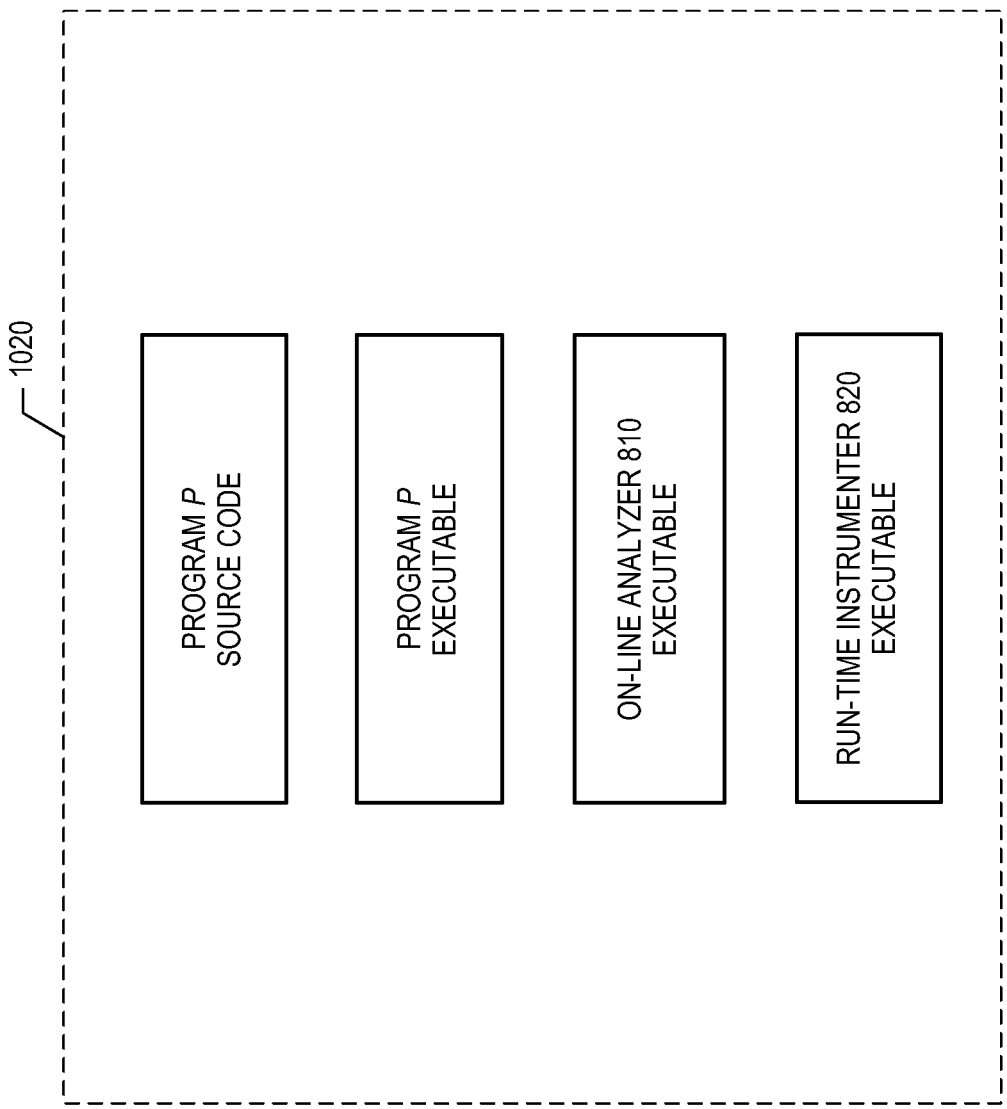
FIG. 11 depicts the salient contents of memory 1020, as shown in FIG. 10, in accordance with the first illustrative embodiment of the present invention.

Memory 1020 stores data, program source code, and executable instructions, as is well-known in the art, and might be any combination of random-access memory (RAM), flash memory, disk drive, etc. In accordance with the first illustrative embodiment of the present invention, memory 1020 stores the source code for a particular program P to be instrumented, the executable instructions (i.e., object code) for program P, an executable program for performing the tasks of off-line analyzer 810, and an executable program for performing the tasks of run-time instrumenter 820, as shown in FIG. 11.

Figure 12:
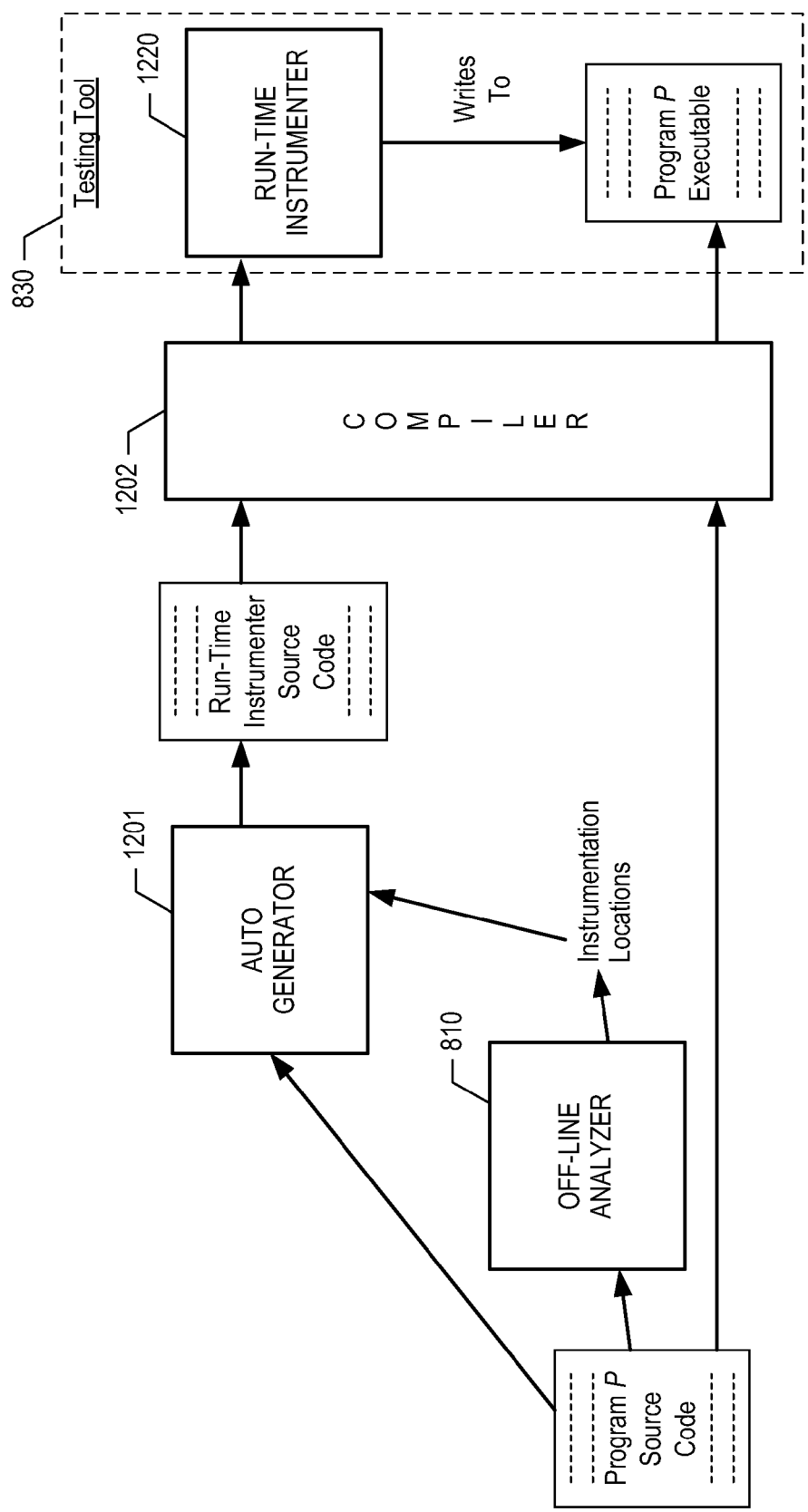
FIG. 12 depicts the high-level architecture of a second illustrative embodiment of the present invention.

FIG. 12 depicts the high-level architecture of a second illustrative embodiment of the present invention. As shown in FIG. 12, the second illustrative embodiment comprises off-line analyzer 810 and testing tool 830 of the first illustrative embodiment, as well as auto generator 1201, compiler 1202, and run-time instrumenter 1220, interconnected as shown.

Auto generator 1201 comprises software, or hardware, or a combination of software and hardware that is capable of generating source code for a run-time instrumenter based on (i) the source code for program P, and (ii) the instrumentation locations determined by off-line analyzer 810. In accordance with the second illustrative embodiment of the present invention, auto generator 1201 generates source code for the run-time instrumenter that is in the same programming language as program P. The auto generator first generates a template of the code, and then replaces the dynamic portion, memory size and probe locations with actual value calculated from the analysis step. The code is output in the same programming language as the original program under testing/monitoring.

Compiler 1202 comprises software, or hardware, or a combination of software and hardware that is capable of generating an executable program from source code, in well-known fashion.

Run-time instrumenter 1220 is an executable software program capable of instrumenting program P during program P's execution, in well-known fashion. In accordance with the second illustrative embodiment of the present invention, run-time instrumenter 1220 replaces each instrumentation location in program P with code patches for saving registers, running probes, restoring registers, removing probes after the first time that they are executed, and putting back the original code at the instrumentation location. In addition, run-time instrumenter 1220 reports code coverage information concerning the execution of program P. In some embodiments of the present invention, run-time instrumenter 1220 might report code coverage information after execution of program P has completed, while in some other embodiments, run-time instrumenter 1220 might report code coverage information during the execution of program P, while in still some other embodiments run-time instrumenter 1220 might report code coverage information both during and after the execution of program P.

Figure 13:
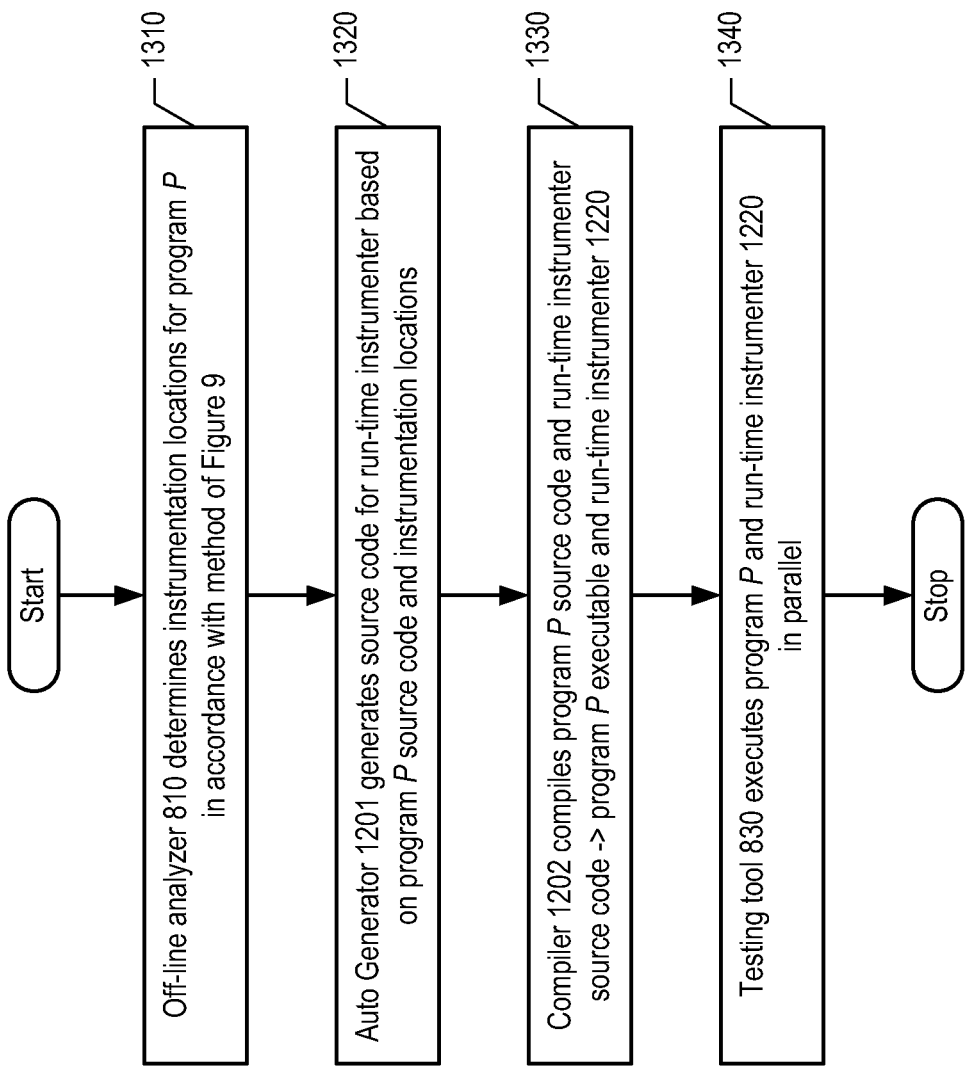
FIG. 13 depicts a flowchart of the salient tasks performed by off-line analyzer 810, testing tool 830, auto generator 1201, compiler 1202, and run-time instrumenter 1220, as shown in FIGS. 8 and 12, in accordance with the second illustrative embodiment of the present invention.

FIG. 13 depicts a flowchart of the salient tasks performed by off-line analyzer 810, testing tool 830, auto generator 1201, compiler 1202, and run-time instrumenter 1220, in accordance with the second illustrative embodiment of the present invention.

At task 1310, off-line analyzer 810 determines instrumentation locations for program P in accordance with the method of FIG. 9, as described above.

At task 1320, auto generator 1201 generates source code for run-time instrumenter that is in the same programming language as program P, based on the program P source code and the instrumentation locations determined at task 1310, as described above.

At task 1330, compiler 1202 compiles the program P source code and run-time instrumenter source code, generating a program P executable and run-time instrumenter 1220, in well-known fashion.

At task 1340, testing tool 830 executes program P and run-time instrumenter 1220 in parallel, in well-known fashion.

After task 1340 is completed, the method of FIG. 13 terminates.

Figure 14:
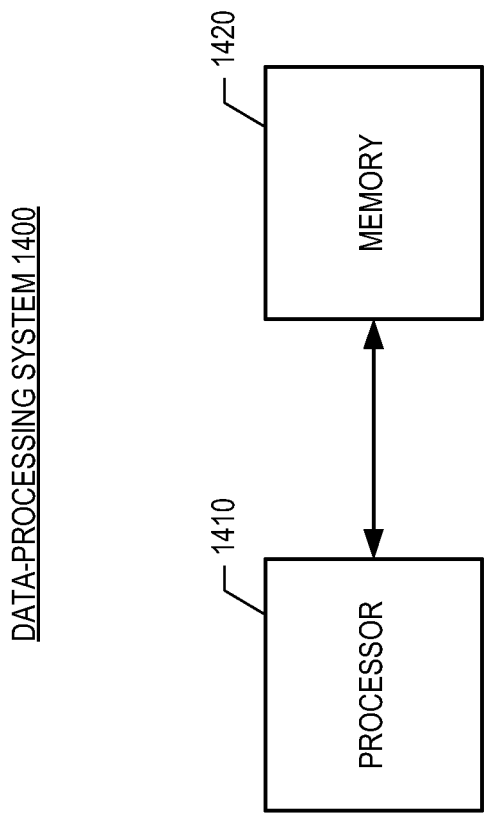
FIG. 14 depicts a data-processing system for instrumenting programs in accordance with the second illustrative embodiment of the present invention.

FIG. 14 depicts data-processing system 1400 for instrumenting programs in accordance with the second illustrative embodiment of the present invention. As shown in FIG. 14, data-processing system 1400 comprises processor 1410 and memory 1420, interconnected as shown.

Processor 1410 is a general-purpose processor that is capable of executing instructions stored in memory 1420, of reading data from and writing data into memory 1420, and of executing the tasks associated with off-line analyzer 810, auto-generator 1201, compiler 1202, and run-time instrumenter 1220, as described above. As will be appreciated by those skilled in the art, in some alternative embodiments of the present invention, processor 1410 might instead be a special-purpose processor; in any case, it will be clear to those skilled in the art, after reading this disclosure, how to make and use processor 1410.

Figure 15:
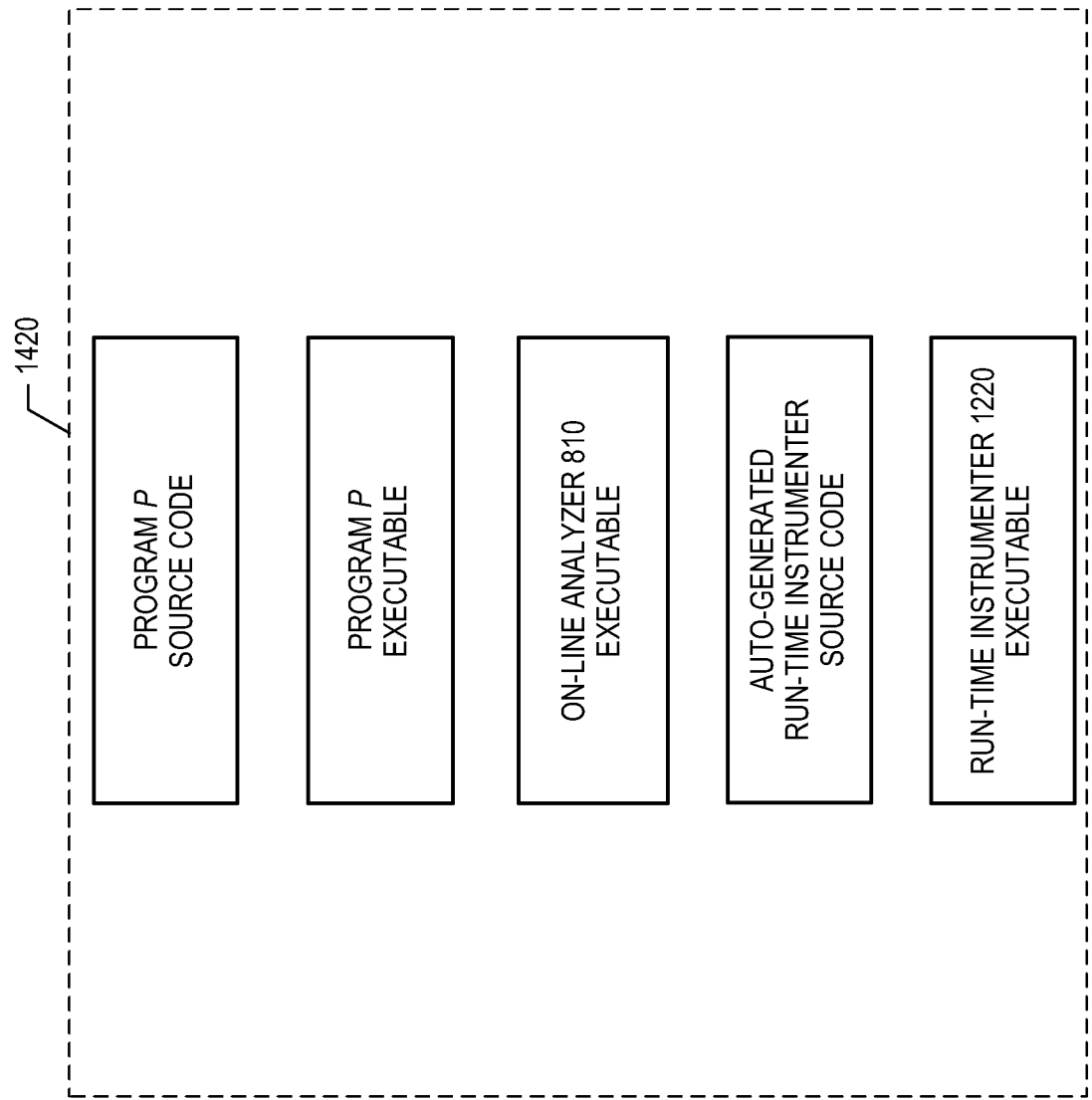
FIG. 15 depicts the salient contents of memory 1420, as shown in FIG. 14, in accordance with the first illustrative embodiment of the present invention.

Memory 1420 stores data, program source code, and executable instructions, as is well-known in the art, and might be any combination of random-access memory (RAM), flash memory, disk drive, etc. In accordance with the second illustrative embodiment, memory 1420 stores the source code for a particular program P to be instrumented, the executable instructions (i.e., object code) for program P, an executable program for performing the tasks of off-line analyzer 810, the auto-generated run-time instrumenter source code, and executable run-time instrumenter 1220, as shown in FIG. 15.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    partitioning, via a processor, a program into blocks of code based on a partition of nodes of a control-flow graph for the program, wherein any two consecutive lines of code are placed in a same block if and only if execution of one of the two consecutive lines of code implies execution of the two consecutive lines of code at some point after the execution of the one of the two consecutive lines of code, wherein the nodes of the control-flow graph are partitioned by an algorithm that employs a single type of mark to mark nodes;
    recursively identifying, via the processor, a set of super nested blocks while traversing the control-flow graph to yield an identified set of super nested blocks; and
    inserting a probe into an innermost layer of basic blocks in each of the blocks of the identified set of super nested blocks.

2. The method of claim 1 wherein the partition of the nodes of the control-flow graph is determined during generation of the control-flow graph.

3. The method of claim 1 wherein the probe is inserted into the innermost layer of basic blocks in each of the blocks of code during generation of the control-flow graph.

4. The method of claim 1 further comprising:
    determining a non-empty subset of nodes of the control-flow graph;
    partitioning the non-empty subset of nodes into subgraphs that correspond to child nodes of the non-empty subset of nodes; and
    determining a respective partition of each of the subgraphs.

5. The method of claim 4 wherein determining the non-empty subset of nodes comprises solving a minimum-cut maximum-flow problem.

6. The method of claim 4 wherein determining the respective partition of each of the subgraphs is performed recursively.

7. The method of claim 1 wherein the control-flow graph is unweighted.

8. A system comprising:
    a processor; and
    a computer-readable storage medium having stored therein instructions which, when executed by the processor, cause the processor to perform a method comprising:
        partitioning a program into blocks of code based on a partition of nodes of a control-flow graph for the program, wherein any two consecutive lines of code are placed in a same block if and only if execution of one of the two consecutive lines of code implies execution of the two consecutive lines of code at some point after the execution of the one of the two consecutive lines of code, wherein the nodes of the control-flow graph are partitioned by an algorithm that employs a single type of mark to mark nodes;
        recursively identifying a set of super nested blocks while traversing the control-flow graph to yield an identified set of super nested blocks; and
        inserting a probe into an innermost layer of basic blocks in each of the blocks of the identified set of super nested blocks.

9. The system of claim 8, wherein the partition of the nodes of the control-flow graph is determined during generation of the control-flow graph.

10. The system of claim 8, wherein the probe is inserted into the innermost layer of basic blocks in each of the blocks of code during generation of the control-flow graph.

11. The system of claim 8, wherein the computer-readable storage medium stores additional instructions which result in the method further comprising:
    determining a non-empty subset of nodes of the control-flow graph;
    partitioning the non-empty subset of nodes into subgraphs that correspond to child nodes of the non-empty subset of nodes; and
    determining a respective partition of each of the subgraphs.

12. The system of claim 8, wherein determining the non-empty subset of nodes comprises solving a minimum-cut maximum-flow problem.

13. The system of claim 8, wherein determining the respective partition of each of the subgraphs is performed recursively.

14. The system of claim 8, wherein the control-flow graph is unweighted.

15. A non-transitory computer-readable storage medium having stored therein instructions which, when executed by a processor, cause the processor to perform a method comprising:
    partitioning a program into blocks of code based on a partition of nodes of a control-flow graph for the program, wherein any two consecutive lines of code are placed in a same block if and only if execution of one of the two consecutive lines of code implies execution of the two consecutive lines of code at some point after the execution of the one of the two consecutive lines of code, wherein the nodes of the control-flow graph are partitioned by an algorithm that employs a single type of mark to mark nodes;
    recursively identifying a set of super nested blocks while traversing the control-flow graph to yield an identified set of super nested blocks; and
    inserting a probe into an innermost layer of basic blocks in each of the blocks of the identified super nested blocks.

16. The non-transitory computer-readable storage medium of claim 15, wherein the partition of the nodes of the control-flow graph is determined during generation of the control-flow graph.

17. The non-transitory computer-readable storage medium of claim 15, wherein the probe is inserted into the innermost layer of basic blocks in each of the blocks of code during generation of the control-flow graph.

18. The non-transitory computer-readable storage medium of claim 15, wherein the control-flow graph is unweighted.

19. The non-transitory computer-readable storage medium of claim 15, storing additional instructions which result in the method further comprising:
    determining a non-empty subset of nodes of the control-flow graph;
    partitioning the non-empty subset of nodes into subgraphs that correspond to child nodes of the non-empty subset of nodes; and
    determining a respective partition of each of the subgraphs.

20. The non-transitory computer-readable storage medium of claim 19, wherein determining the partition of each of the respective subgraphs is performed recursively.

* * * * *